(12) United States Patent
Huang et al.

(10) Patent No.: US 8,480,143 B2
(45) Date of Patent: Jul. 9, 2013

(54) ENERGY ABSORBING STRUCTURE FOR VEHICLE BUMPER

(75) Inventors: Matthew Miinshiou Huang, Canton, MI (US); James Chih Cheng, Troy, MI (US); Marwan Ahmad Elbkaily, Canton, MI (US); Chunyu Wang, Dearborn, MI (US); James Robert Pederson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 12/964,912

(22) Filed: Dec. 10, 2010

(65) Prior Publication Data
US 2012/0146347 A1 Jun. 14, 2012

(51) Int. Cl.
*B60R 19/03* (2006.01)

(52) U.S. Cl.
USPC ........................................... 293/120

(58) Field of Classification Search
USPC ............. 293/120, 102, 121, 122, 132, 133, 293/136, 154, 155, 109, 110, 134, 135, 137; 267/140, 116, 139; 114/219; 188/377; 29/897.2; 180/274
See application file for complete search history.

(56) References Cited

U.S. PATENT DOCUMENTS

| | | | | |
|---|---|---|---|---|
| 6,199,937 B1 * | 3/2001 | Zetouna et al. | ............... | 293/136 |
| 6,406,081 B1 * | 6/2002 | Mahfet et al. | ................ | 293/133 |
| 6,609,740 B2 * | 8/2003 | Evans | ............................ | 293/121 |
| 6,669,251 B2 | 12/2003 | Trappe | | |
| 6,746,061 B1 * | 6/2004 | Evans | ........................... | 293/120 |
| 6,848,730 B2 * | 2/2005 | Evans | ........................... | 293/121 |
| 6,877,785 B2 * | 4/2005 | Evans et al. | ................... | 293/120 |
| 6,938,936 B2 * | 9/2005 | Mooijman et al. | ............ | 293/120 |
| 6,986,536 B1 * | 1/2006 | Heatherington et al. | ..... | 293/102 |
| 7,163,242 B2 | 1/2007 | Shuler et al. | | |
| 7,222,897 B2 * | 5/2007 | Evans et al. | .................... | 293/120 |
| 7,278,667 B2 * | 10/2007 | Mohapatra et al. | ........... | 293/132 |
| 7,628,444 B2 | 12/2009 | Cormier et al. | | |
| 7,641,246 B2 * | 1/2010 | Ichikawa et al. | .............. | 293/102 |
| 8,016,331 B2 * | 9/2011 | Ralston et al. | ................ | 293/120 |
| 2003/0155806 A1 * | 8/2003 | Goto et al. | ..................... | 301/120 |
| 2003/0189343 A1 * | 10/2003 | Evans et al. | .................... | 293/120 |
| 2004/0066048 A1 * | 4/2004 | Mooijman et al. | ............ | 293/120 |
| 2004/0174025 A1 * | 9/2004 | Converse et al. | ............. | 293/133 |
| 2005/0057053 A1 * | 3/2005 | Evans et al. | .................... | 293/133 |
| 2006/0125250 A1 * | 6/2006 | Evans | ........................... | 293/121 |

(Continued)

FOREIGN PATENT DOCUMENTS
WO 02083459 A2 10/2002

*Primary Examiner* — Kiran B Patel
(74) *Attorney, Agent, or Firm* — Jason Rogers; Brooks Kushman P.C.

(57) ABSTRACT

A bumper assembly for an automotive vehicle comprises a bumper beam for connection to a frame of the vehicle and an energy absorbing component extending laterally adjacent a front surface of the bumper beam. The energy absorbing component comprises a plurality of laterally-spaced bands, each band comprising an upper wall, a lower wall, and a forward wall. The bands are connected along adjacent rear edges of the upper walls and/or adjacent rear edges of the lower walls, such that the bands are decoupled from one another forward of the rear edges. This construction allows the bands to deform individually during a pedestrian collision, the upper and lower walls buckling to absorb energy in an optimum manner. The energy absorbing component may be attached to the bumper beam by upper and/or lower lateral strips have mounting features for fitting into interference-fit engagement with mating features on the bumper beam.

6 Claims, 7 Drawing Sheets

U.S. PATENT DOCUMENTS

| | | |
|---|---|---|
| 2007/0182174 A1* | 8/2007 | Nakayama et al. ............ 293/115 |
| 2008/0185851 A1* | 8/2008 | Evans et al. ................... 293/120 |
| 2008/0309103 A1* | 12/2008 | Frederick et al. ............. 293/142 |
| 2010/0102580 A1* | 4/2010 | Brooks et al. ................. 293/133 |
| 2011/0109105 A1* | 5/2011 | Ralston et al. ................ 293/132 |
| 2012/0049546 A1* | 3/2012 | Chickmenahalli et al. ... 293/132 |

* cited by examiner

ENERGY ABSORBING STRUCTURE FOR VEHICLE BUMPER

BACKGROUND

1. Technical Field

The present invention relates to bumper assemblies for automotive vehicles and specifically to a bumper assembly having an energy absorbing component for pedestrian impact protection.

2. Background Art

National and international regulatory and standards-setting groups have proposed minimum levels of protection for pedestrians when struck by automotive vehicles. These requirements increase the complexity of vehicle designs, both in the need to provide an effective level of injury protection for pedestrians and also in ways to meet such requirements while not impairing the appearance of the vehicle.

In general, to minimize injury to a pedestrian struck by a moving vehicle, an energy management component or substructure should absorb the majority of the impact energy early in a collision event, but effectively disappear from the system a short time after the impact.

SUMMARY

According to an embodiment disclosed herein, a bumper assembly for an automotive vehicle comprising a bumper beam for connection to a frame of the vehicle to extend laterally across the vehicle and an energy absorbing component extending laterally adjacent a front surface of the bumper beam. The energy absorbing component comprises a plurality of laterally-spaced bands, each band comprising an upper wall, a lower wall, and a forward wall. The bands are joined with one another only along the adjacent rear edges of the upper walls and/or the adjacent rear edges of the lower walls, such that the bands are detached and spaced from one another forward of the rear edges. This construction allows the bands to deform individually during a pedestrian collision, the upper and lower walls buckling to absorb energy in an optimum manner.

According to another embodiment disclosed herein, an energy absorbing component for mounting forward of a bumper beam of an automotive vehicle comprises a plurality of bands, each of the bands comprising an upper wall, a lower wall, and a forward wall. The bands are joined with one another only along adjacent rear edges of the upper walls and adjacent rear edges of the lower walls, the bands being decoupled from one another forward of the rear edges.

According to another embodiment disclosed herein, an energy absorbing component mountable forward of a bumper beam of an automotive vehicle comprises a plurality of bands, each of the bands comprising an upper wall, a lower wall, and a forward wall. The bands are joined with one another only by at least one of: 1) an upper lateral strip connecting rear edges of adjacent upper walls, and 2) a lower lateral strip connecting rear edges of adjacent lower walls. The bands are thus decoupled from one another forward of the rear edges. At least one of the upper and lower lateral strips have mounting features for fitting into interference-fit engagement with mating features on the bumper beam.

BRIEF DESCRIPTION OF THE DRAWINGS

Embodiments of the present invention will now be described by way of example only with reference to the accompanying drawings in which.

DETAILED DESCRIPTION

Figure 1:
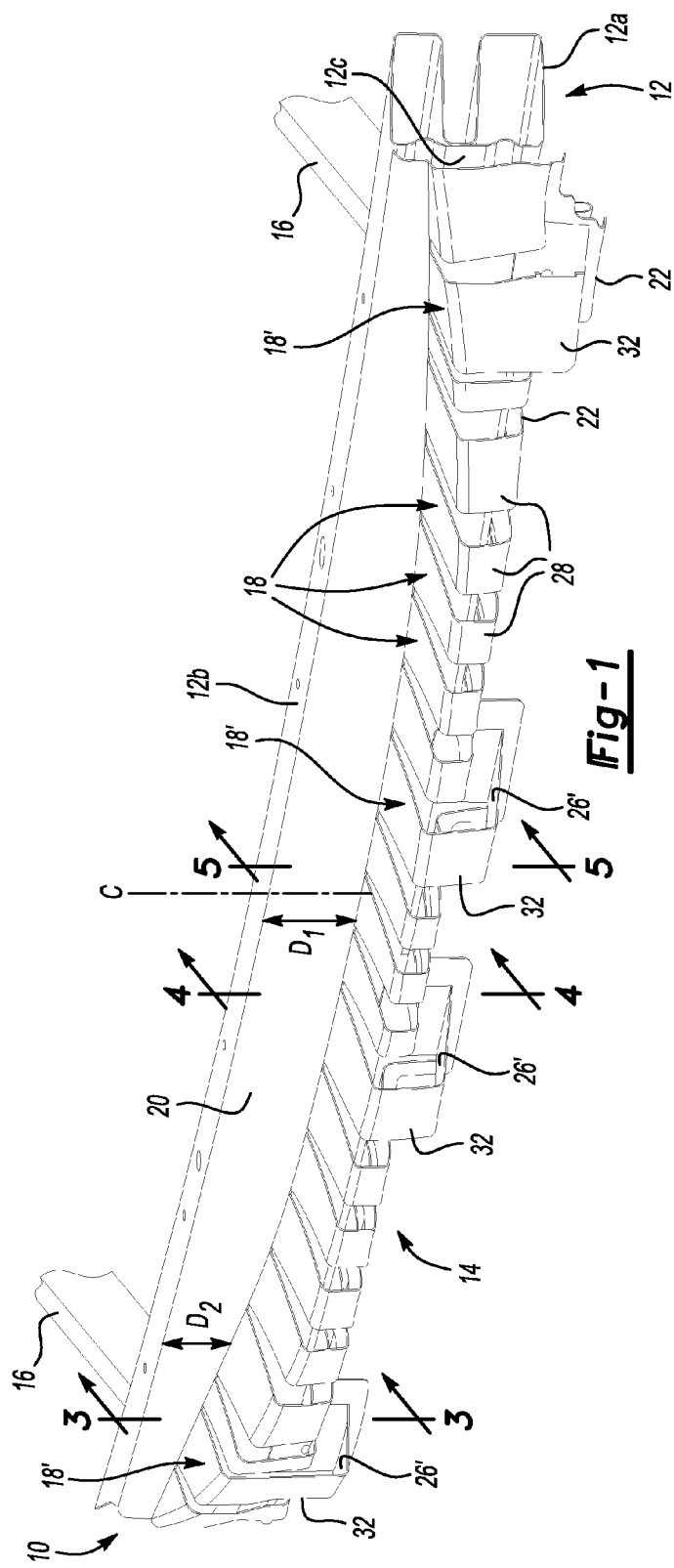
FIG. 1 is a perspective schematic view of a bumper assembly having an impact absorbing component.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As seen in FIGS. 1-6, a bumper assembly 10 for use in an automotive vehicle comprises a bumper beam 12 and an energy absorbing component 14 disposed forward of the bumper beam. Bumper beam 12 is arranged generally laterally or transversely across the forward portion of an automotive vehicle and is supported adjacent its opposite lateral ends by frame rails 16. Bumper beam 12, as is well known in the art, is formed as a structurally rigid material and provides crash resistance and strength to the forward portion of the vehicle. Bumper beam 12 may, for example, be formed of steel or a high-strength composite material.

Energy absorbing component (EAC) 14 positioned immediately in front of a forward surface of bumper beam 12 and preferably extends across a majority of the width of the bumper beam. EAC 14 may be formed of any appropriate material that provides good impact resistance and energy absorption over a wide range of ambient temperatures, good flow characteristics for forming, etc. A composite resin material such as Xenoy® is one example of such a material known to be used in similar energy absorbing applications.

EAC 14 comprises a plurality of laterally spaced bands 18 connected along their respective rear edges by an upper lateral strip 20 and a lower lateral strip 22. As best seen in the cross-sectional views of FIGS. 3-5, each band 18 comprises an upper wall 24, a lower wall 26, and a front wall 28 interconnected as shown to provide a generally C-shaped cross section. It is to be understood that the terms front, forward, rear, back and related terms refer to the overall configuration of an automotive vehicle to which the bumper assembly 10 is attached. Each band 18 is detached and spaced from its neighboring bands on either side at all points forward of the junction between the rear most edge of upper wall 24 and upper lateral strip 20, and forward of the junction between the rear most edge of lower wall 26 with lower lateral strip 22.

Figure 2:
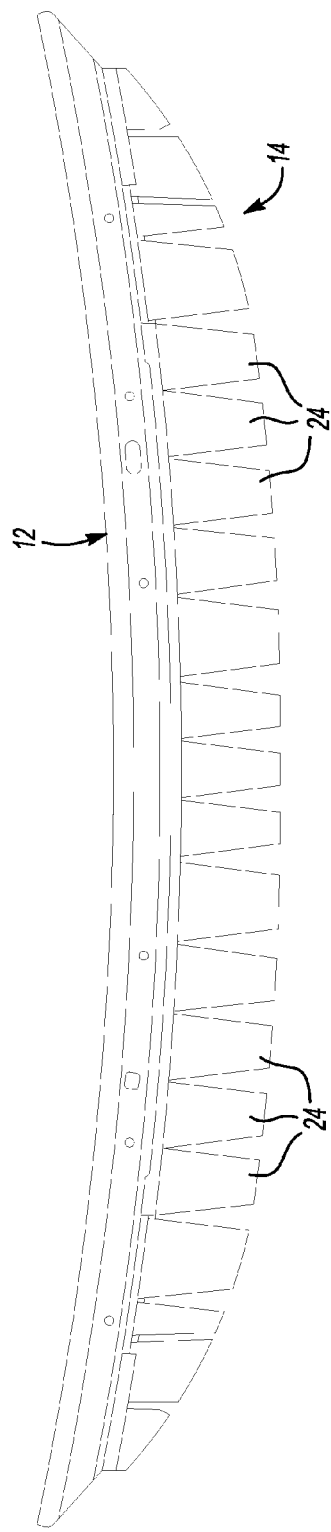
FIG. 2 is a schematic top view of the bumper assembly of FIG. 1.
Figure 3:
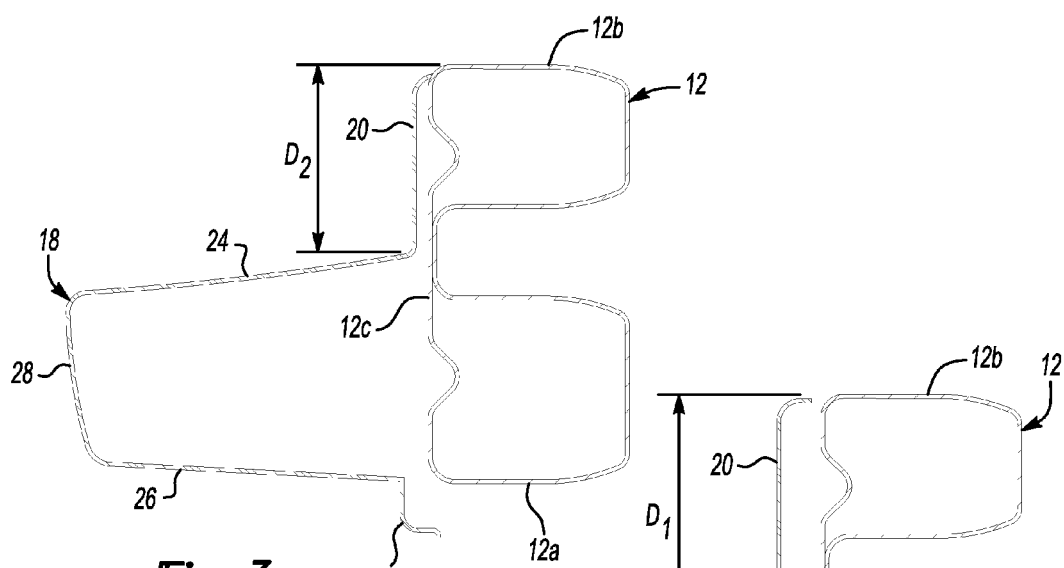
FIG. 3 is a cross-sectional taken along line 3-3 in FIG. 1.
Figure 4:
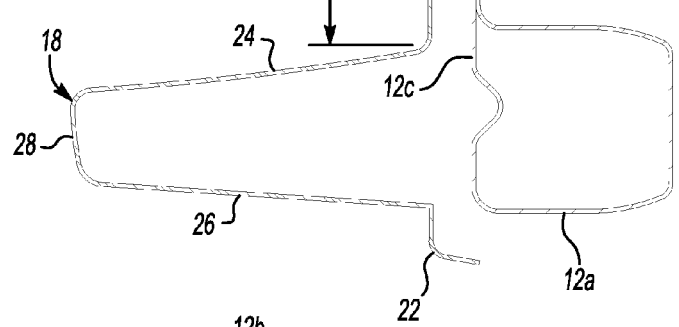
FIG. 4 is a cross-sectional view taken along line 4-4 of FIG. 1.

As best seen in FIG. 2, upper and lower walls 24, 26 of one or more bands may be tapered or trapezoidal in shape, having maximum widths adjacent their respective rear edges and tapering to a minimum width adjacent the front wall 28. The geometry (width and/or height and/or material thickness, etc.) of each of band 18 may vary over the lateral width of EAC 14, as is visible in FIG. 2. This variation in geometry of bands 18 may be used to tune the crash/impact response of a particular portion of the front of the bumper assembly 10 as necessary to meet safety requirements.

The vertical positioning of the bands 18 relative to the bumper beam 12 may vary across the lateral width of the bumper beam. As seen in FIG. 1, upper walls 18 of bands adjacent to a lateral center C of the bumper beam 12 are located at a first distance $D_1$ below an upper surface 12b of the bumper beam, while upper walls of the bands adjacent to outboard ends of the bumper beam (farther from the lateral center C) are located at a second distance $D_2$ below the upper surface, where the second distance $D_2$ is smaller than the first distance $D_1$. This relationship is further illustrated in FIGS. 3 and 4.

In the embodiment depicted, EAC 14 is attached to bumper beam 12 only at spaced-apart points adjacent the lateral ends of the bumper beam, as shown in FIGS. 1 and 2, so that portions of upper and lower lateral strips 20,22 between and/or outboard of the attachment points are spaced from the forward surface of the bumper beam. This may be desirable for ease of manufacturing bumper assembly 10 and the overall vehicle. Alternatively, EAC 14 may be attached to bumper beam 12 across its entire width, or a majority of its width. This may be accomplished, for example, by having the upper lateral strip 20 and/or lower lateral strips snap into an interference-fit engagement with cooperating mounting features (not shown) on the bumper beam.

Figure 5:
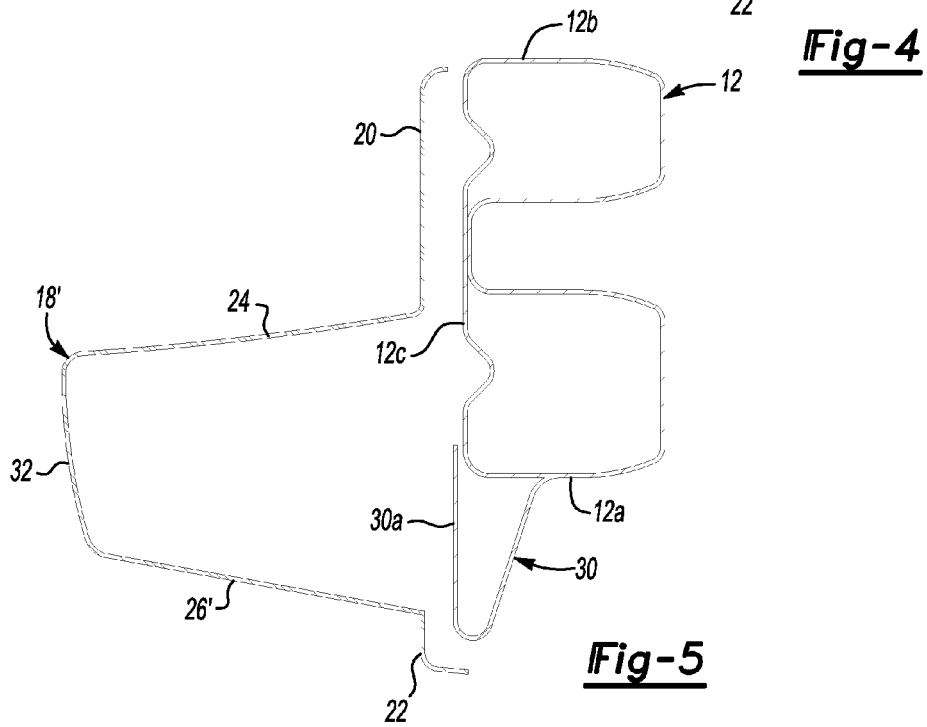
FIG. 5 is a cross-sectional view taken along line 5-5 of FIG. 1.
Figure 6:
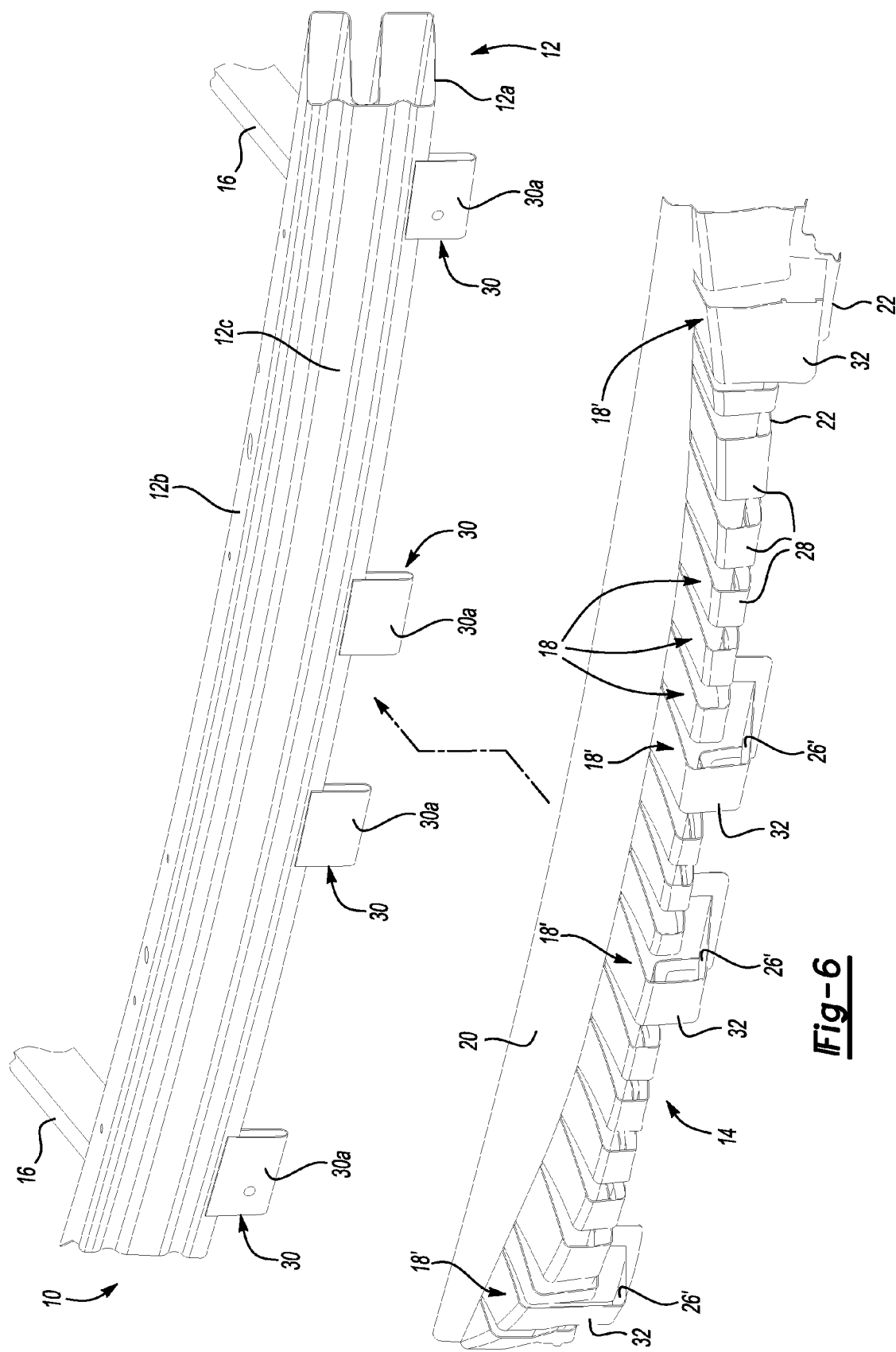
FIG. 6 is an exploded view of the bumper assembly of FIGS. 1 and 2.

Bumper assembly 10 may further comprise one or more stoppers 30 that are attached to bumper beam 12 and extend downwardly lower than a lower surface 12a of the beam with forward surfaces 30a of the stoppers approximately coplanar with a forward surface 12c of the bumper beam. The disclosed embodiment includes four stoppers 30, which may be located at areas where increased levels of pedestrian protection are desired. The portions of EAC 14 located directly in front of stoppers 30 have one or more bands 18' that comprise extended depth front walls 32, as best seen in FIG. 5. The extended depth front walls 32 result in the upper and lower walls 24, 26' of bands 18' being spaced farther apart vertically than is the case for bands 18 located in front of portions of bumper beam 12 where the stoppers 30 are not present. The lower walls 26' that are joined with the extended-depth front walls 32 are therefore positioned lower than the bumper beam lower surface 12a (best seen in FIG. 5). The portions of lower lateral strip 22 located in front of stoppers 30 and joined to the rear edges of lower walls 26' are in approximate vertical alignment with the lower-most extent of the stoppers. Stoppers 30 in combination with bands 18' having extended depth front walls 32 provide greater surface area for contact with a pedestrian leg.

Figure 7:
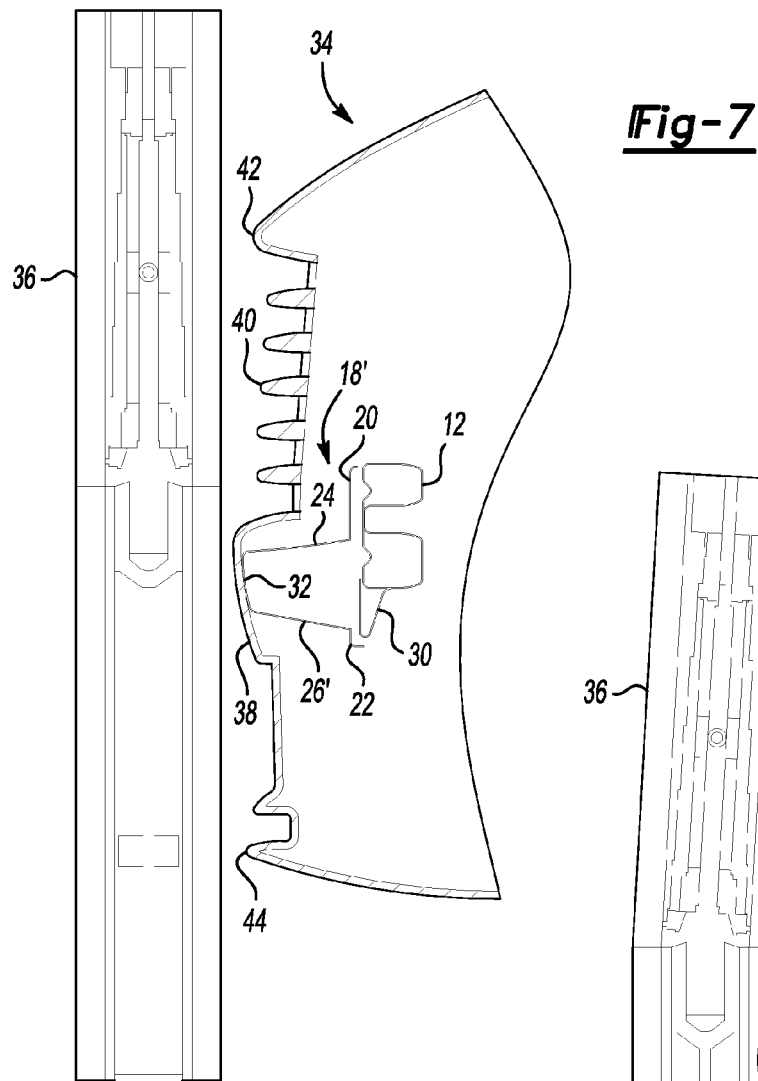
FIG. 7 is a schematic side view of a vehicle having an energy absorbing bumper assembly immediately prior to contact with a lower leg test sample.

FIG. 7 schematically depicts an automotive vehicle 34 including a bumper beam 12 an energy absorbing component 14 as shown in FIGS. 1-6. The cross section is taken through a location that includes an extended depth front wall 32 and stopper 30, and shows other vehicle front-end components such as a bumper fascia 38, a grille 40, an upper fascia 42, and a lower fascia 44. A leg form 36 is positioned directly in front of vehicle 34 and in contact with the front of the vehicle, as may occur at the instant of contact (t=0.0 sec.) during a pedestrian impact test procedure. Leg form 36 is representative of the type of test apparatus used by some safety regulatory bodies to conduct pedestrian impact tests. Leg form 36 may, as is well known in the art, be instrumented with accelerometers to measure forces/accelerations applied to the leg form during a test.

Figure 8:
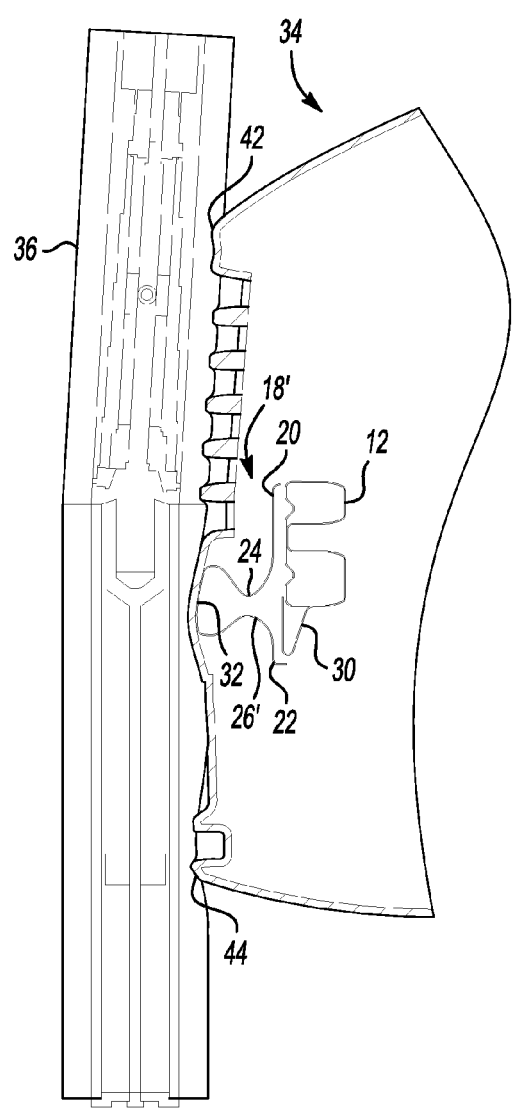
FIG. 8 is a view similar to FIG. 7 immediately after contact with the leg test sample.

FIG. 8 shows the vehicle 34 and leg form 36 of FIG. 7 a short time after initial contact during a test sequence in which the vehicle is travelling at 25 miles per hour, for example at approximately t=5 to 10 milliseconds (ms). Band 18 is shown to be crushed between the rear surface of bumper fascia 38 and the front surface of bumper beam 12. Upper and lower walls 24, 26 have started to buckle towards one another. Other components making up the front portion of the vehicle that come into contact with the leg form 36 may, as is well known in the art, be constructed in a manner to absorb kinetic energy as they deform during such a pedestrian collision.

Figure 11:
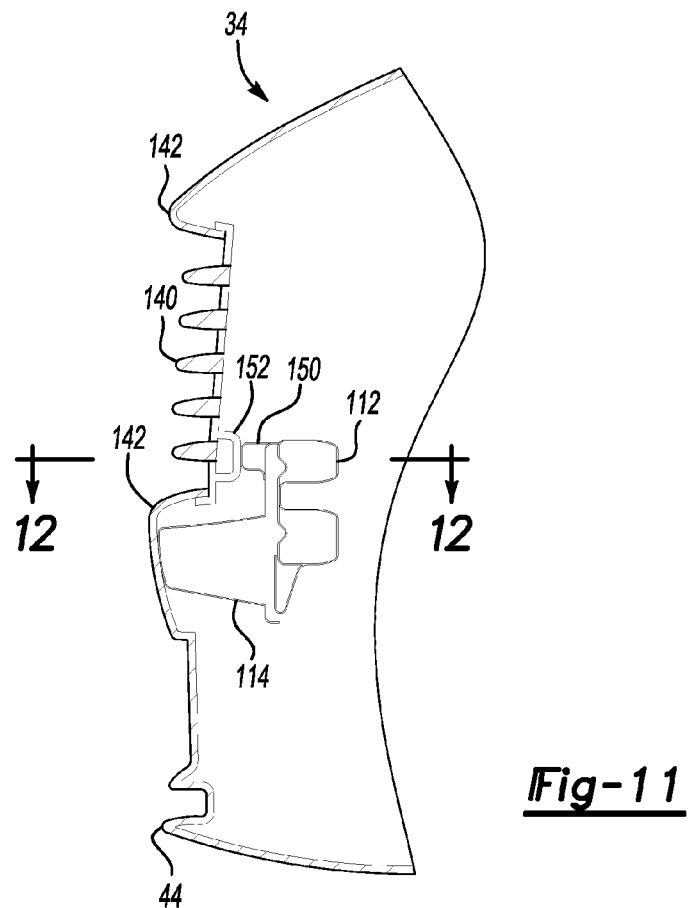
FIG. 11 is a schematic side cross-sectional view of an energy absorbing element attached to a an upper grille.
Figure 12:
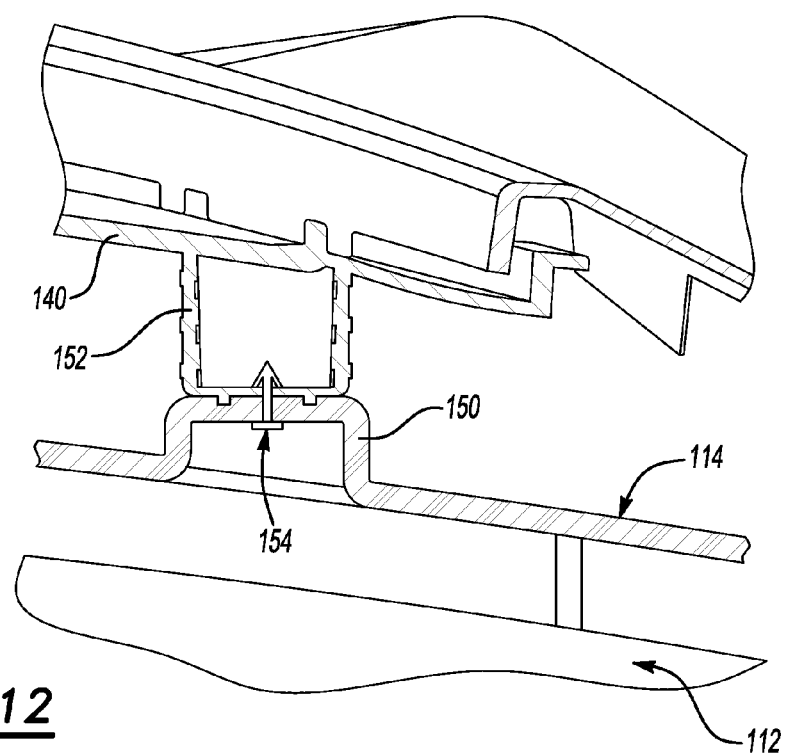
FIG. 12 is a partial cross-sectional view taken along line 12-12 in FIG. 11.

It is also possible for an EAC to be attached to a rear surface of a forward body trim component located forward of the bumper beam rather than being attached to the bumper beam. FIGS. 11 and 12 depict one such possible construction in which EAC 114 is secured to an upper grille 140 which is, in turn, secured to an inner surface of a front fascia 138. EAC 114 includes two or more projecting bosses 150 spaced across the width of the part that engage attachment brackets 152 that are provided on the upper grille 140. Projecting bosses 150 and attachment brackets 152 may snap into interference-fit engagement with one another, and/or separate fasteners 154 (such as push-in or threaded fasteners) may be used to secure them together. As is well known in the automotive body arts, forward body trim components such as front fascia 138 and upper grille 140 may be formed of reinforced or un-reinforced plastic materials and may be connected with one another through mating features that snap into engagement with one another and/or by separate fasteners (not shown).

During manufacture of the vehicle, this construction allows a front trim assembly including, for example, front fascia 138, upper grille 140, EAC 114, and/or other trim pieces, to be built up (perhaps at plant remote from the final vehicle assembly plant) and subsequently secured to the vehicle body so that the EAC is properly positioned relative to the bumper beam 112 and other vehicle components.

Figure 9:
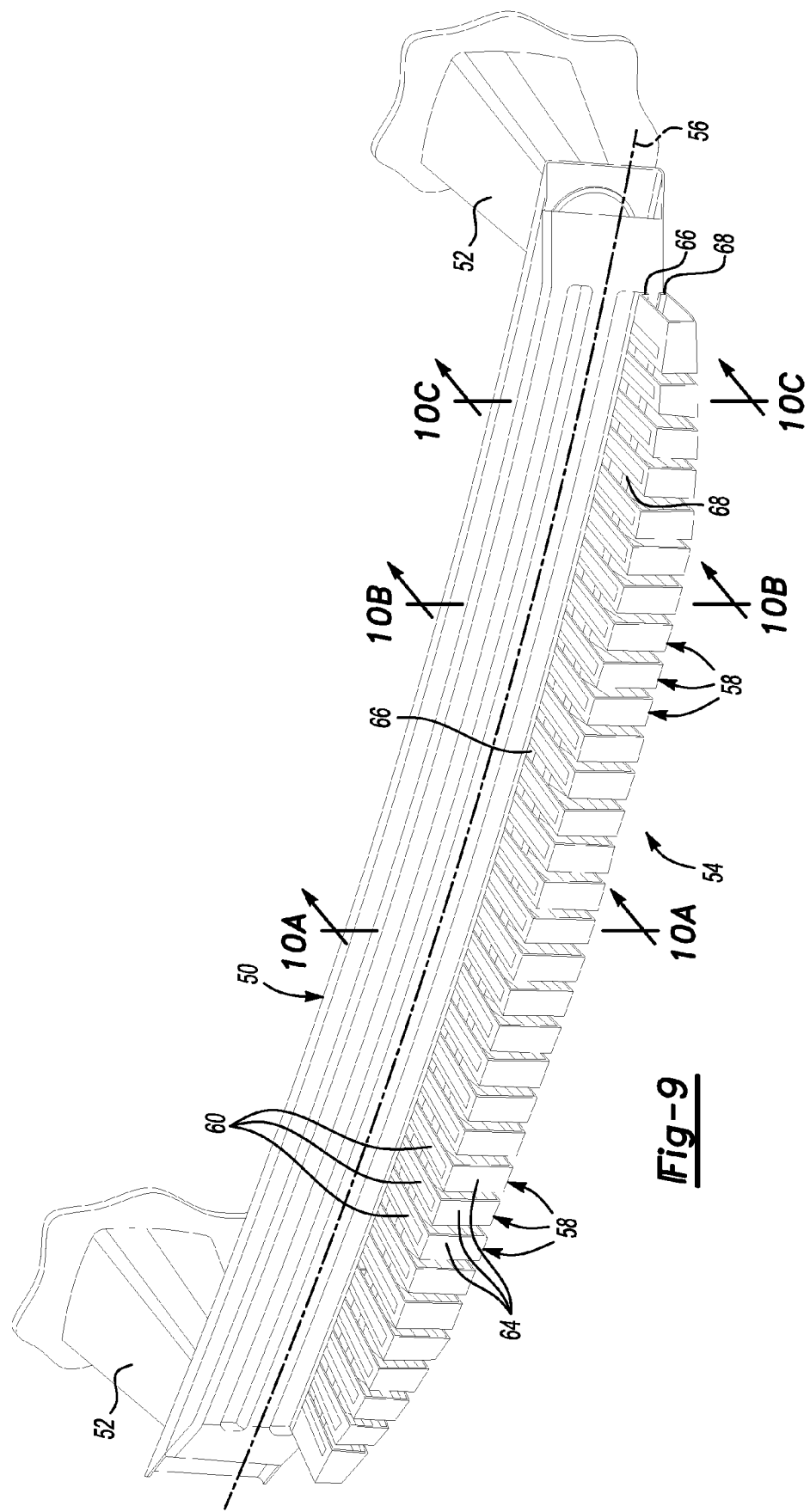
FIG. 9 is a view of the second embodiment of a bumper assembly including a bumper beam and an energy absorbing element.
Figure 10A:
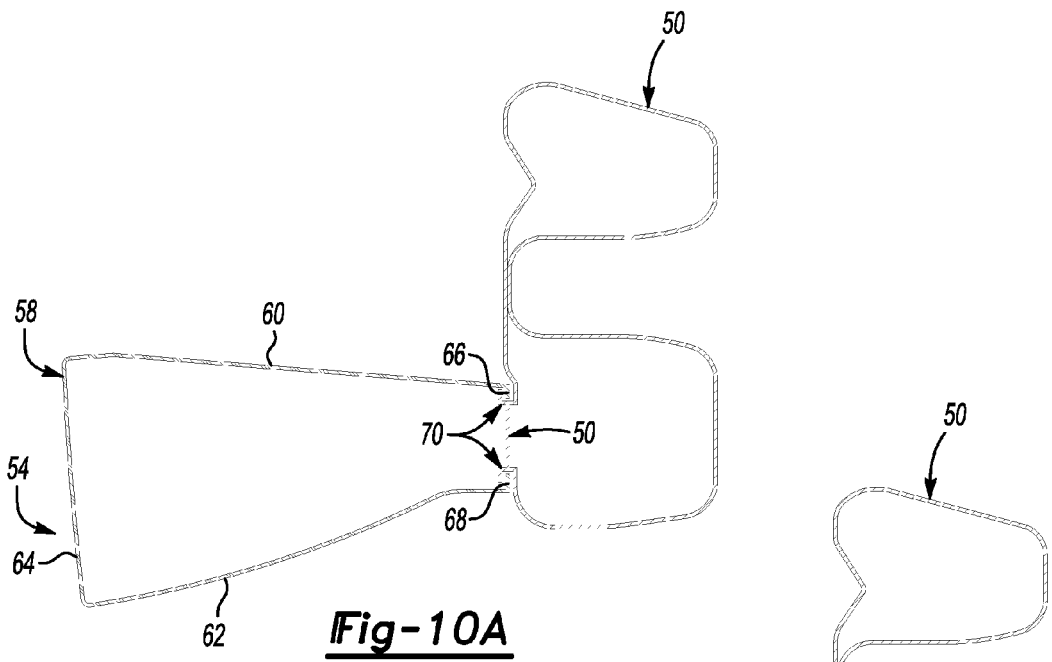
FIGS. 10A-C are schematic side views of alternative embodiments of an energy absorbing band as may be used in the assembly of FIG. 9.
Figure 10B:
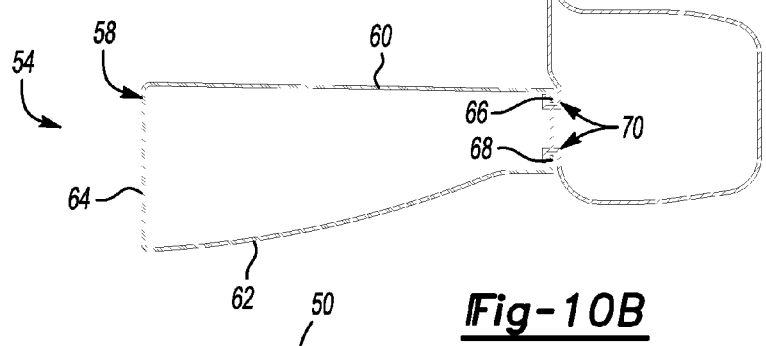
Figure 10C:
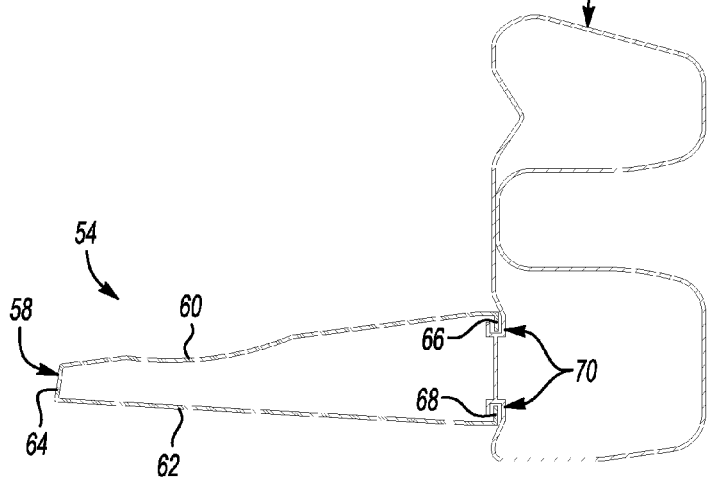

FIG. 9 shows another embodiment of a bumper beam 50 attached to frame rails 52 of a motor vehicle. An energy absorbing component (EAC) 54 is attached to a forward surface of bumper beam 50. EAC 54 is positioned below a horizontal center line 56 of bumper beam 50. EAC 54 is made up of multiple, laterally spaced bands 58, each of the bands composed of an upper wall 60, a lower wall 62, and a forward wall 64. An upper lateral strip 66 extends along and interconnects the rear-most edges of upper wall 60, and a lower lateral strip 68 extends along and interconnects the rear-most edges of lower walls 62. At least a portion of the upper and lower lateral strips 66, 68 may snap into engagement with mating features formed on the bumper beam 60, such as notches or grooves 70. Cross-sectional views shown in FIGS. 10A-10C depict three of many possible different configurations of bands 58, as may be dictated by the desired pedestrian impact response along with other factors such as vehicle styling and/or manufacturing considerations. In the embodiments of FIGS. 10A and 10B, upper walls 60 and lower wall 62 diverge from one another as they extend forwardly from bumper beam 50 such that front walls 64 are relatively deep compared with the vertical dimension of the bands adjacent their rearmost (bumper adjacent) ends. In the embodiment of FIG. 10C, upper and lower walls 60, 62 converge as they extend forwardly from bumper beam 50 so that front wall 64 is relatively short.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A bumper assembly for an automotive vehicle comprising:
    a bumper beam for connection to a frame of the vehicle to extend laterally across the vehicle and including a stopper extending below a lower surface of the bumper beam, a forward surface of the stopper being approximately coplanar with a forward surface of the bumper beam; and
    an energy absorbing component extending laterally adjacent a front surface of the bumper beam and comprising a plurality of laterally-spaced bands, each band comprising an upper wall, a lower wall, and a forward wall, the bands joined with one another only along at least one of 1) adjacent rear edges of the upper walls and 2) adjacent rear edges of the lower walls, such that the bands are detached and spaced from one another forward of the rear edges of the upper and lower walls, wherein at least one of the bands is located forward of the stopper and has an extended-depth front wall extending downwardly below the lower surface of the bumper beam and a lower wall lower than the lower surface of the bumper beam.

2. The apparatus according to claim 1 wherein the rear edges of the lower walls are joined by a lower lateral strip extending parallel with the front surface of the bumper beam, and the rear edges of the upper walls are joined by an upper lateral strip extending parallel with the front surface of the bumper beam.

3. The apparatus according to claim 2 wherein at least a portion of at least one of the lower lateral strip and the upper lateral strip fits into engagement with mating features on the bumper beam.

4. The apparatus according to claim 1 wherein the bands adjacent to a lateral center of the bumper beam have upper walls located at a first distance below an upper surface of the bumper beam, and the bands adjacent to outboard ends of the bumper beam have upper walls located at a second distance below the upper surface of the bumper beam, the second distance being smaller than the first distance.

5. The apparatus according to claim 1 wherein the upper and lower walls of at least one of the bands have a maximum width adjacent their rear edges and taper to a minimum width adjacent the front wall.

6. The apparatus according to claim 1 further comprising a forward body trim component located forward of the energy absorbing component, the energy absorbing component being attached to the trim component such that assembly of the forward body component with the vehicle properly positions the energy absorbing component relative to the bumper beam.

* * * * *